(12) United States Patent
Choi

(10) Patent No.: US 12,500,435 B2
(45) Date of Patent: Dec. 16, 2025

(54) BATTERY CONTROL APPARATUS AND BATTERY CONTROL METHOD

(71) Applicant: LG Energy Solution, Ltd., Seoul (KR)

(72) Inventor: Dong-In Choi, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 0 days.

(21) Appl. No.: 18/727,808

(22) PCT Filed: Apr. 19, 2023

(86) PCT No.: PCT/KR2023/005332
§ 371 (c)(1),
(2) Date: Jul. 10, 2024

(87) PCT Pub. No.: WO2023/204612
PCT Pub. Date: Oct. 26, 2023

(65) Prior Publication Data
US 2024/0421622 A1 Dec. 19, 2024

(30) Foreign Application Priority Data

Apr. 21, 2022 (KR) .................. 10-2022-0049483
Apr. 17, 2023 (KR) .................. 10-2023-0050321

(51) Int. Cl.
H02J 7/00 (2006.01)
G01R 31/367 (2019.01)
(Continued)

(52) U.S. Cl.
CPC ........... *H02J 7/0069* (2020.01); *H01M 10/44* (2013.01); *H01M 10/48* (2013.01); *H02J 7/0048* (2020.01);
(Continued)

(58) Field of Classification Search
CPC ...... H02J 7/0069; H02J 7/0048; H02J 7/0071; H02J 7/00712; H01M 10/44; H01M 10/48
(Continued)

(56) References Cited

U.S. PATENT DOCUMENTS 4,829,225 A * 5/1989 Podrazhansky ...... H02J 7/00711
320/129
4,878,007 A * 10/1989 Gabor .................. H02J 7/00711
320/136
(Continued)

FOREIGN PATENT DOCUMENTS

CN 107710545 B 10/2020
EP 3211709 A1 8/2017
(Continued)

OTHER PUBLICATIONS

International Search Report for PCT/KR2023/005332 mailed Aug. 16, 2023. 3 pages.
(Continued)

*Primary Examiner* — John T Trischler
(74) *Attorney, Agent, or Firm* — Lerner David LLP

(57) ABSTRACT

A battery control apparatuses may include a measuring unit for measuring a voltage of a battery, a memory for storing a multi-stage charging protocol data, and a processor for identifying a SOC of the battery based on the voltage measurement value. The processor may perform a temporary discharging procedure, when the SOC of the battery reaches the first criterion SOC while the constant current charging procedure using the first current rate is in progress. The processor may also determine an adjusted second current rate different from the second current rate based on discharging information of the temporary discharging procedure and, after the temporary discharging procedure is
(Continued)

finished, perform a constant current charging procedure using the adjusted second current rate.

11 Claims, 10 Drawing Sheets

(51) Int. Cl.
    *G01R 31/392* (2019.01)
    *H01M 10/44* (2006.01)
    *H01M 10/48* (2006.01)
    *G01R 31/3835* (2019.01)

(52) U.S. Cl.
    CPC ........ *H02J 7/0071* (2020.01); *H02J 7/00712* (2020.01); *G01R 31/367* (2019.01); *G01R 31/3835* (2019.01); *G01R 31/392* (2019.01); *H01M 2220/20* (2013.01)

(58) Field of Classification Search
    USPC .......................................................... 320/134
    See application file for complete search history.

(56) References Cited

U.S. PATENT DOCUMENTS

| | | | | |
|---|---|---|---|---|
| 5,307,000 | A * | 4/1994 | Podrazhansky | H02J 7/00711 320/149 |
| 5,561,360 | A * | 10/1996 | Ayres | H02J 7/00711 320/147 |
| 6,366,056 | B1 * | 4/2002 | Podrazhansky | H01M 10/44 320/141 |
| 6,377,030 | B1 * | 4/2002 | Asao | H02J 7/0069 320/161 |
| 7,135,839 | B2 * | 11/2006 | Iida | H01M 10/482 320/149 |
| 7,626,359 | B2 * | 12/2009 | Imai | H02J 7/00304 320/122 |
| 8,334,675 | B2 * | 12/2012 | Wang | H02J 7/007192 320/129 |
| 9,081,068 | B2 * | 7/2015 | Mattisson | G01R 31/3835 |
| 9,651,628 | B2 * | 5/2017 | Mattisson | G01R 31/3842 |
| 10,090,695 | B2 * | 10/2018 | Card | H02J 7/00711 |
| 10,126,367 | B2 * | 11/2018 | Lee | H01M 10/525 |
| 10,164,456 | B2 * | 12/2018 | Luo | H01M 10/525 |
| 10,236,702 | B2 * | 3/2019 | Ha | H02J 7/0069 |
| 10,406,932 | B2 * | 9/2019 | Unno | B60L 58/21 |
| 10,547,196 | B2 * | 1/2020 | Jung | H02J 7/00714 |
| 10,605,870 | B2 * | 3/2020 | Kim | H02J 7/00714 |
| 10,886,767 | B2 * | 1/2021 | Kim | H01M 10/484 |
| 10,985,590 | B2 * | 4/2021 | Lim | H01M 10/425 |
| 10,998,752 | B2 * | 5/2021 | Jung | H02J 7/007182 |
| 11,056,900 | B2 * | 7/2021 | Dang | H02J 7/007182 |
| 11,119,157 | B2 * | 9/2021 | Kim | G01R 31/36 |
| 11,183,706 | B2 * | 11/2021 | Miyajima | B60L 53/62 |
| 11,237,216 | B1 * | 2/2022 | Chang | G01R 31/388 |
| 11,271,257 | B2 * | 3/2022 | Li | H01M 10/0562 |
| 11,404,896 | B2 * | 8/2022 | Du | H02J 7/00712 |
| 11,552,494 | B2 * | 1/2023 | Kim | H01M 10/486 |
| 11,594,906 | B2 * | 2/2023 | Kim | H02J 7/007194 |
| 11,865,943 | B2 * | 1/2024 | Luo | H02J 7/005 |
| 11,909,244 | B2 * | 2/2024 | Li | H01M 10/44 |
| 11,940,500 | B1 * | 3/2024 | Chang | H02J 7/00 |
| 12,007,449 | B2 * | 6/2024 | Cha | H02J 7/00712 |
| 12,276,704 | B2 * | 4/2025 | Lee | H01M 10/42 |
| 2005/0225289 | A1 * | 10/2005 | Iida | H01M 10/482 320/116 |
| 2009/0102421 | A1 * | 4/2009 | Imai | H02J 7/0014 320/122 |
| 2011/0109273 | A1 * | 5/2011 | Tamezane | B60L 58/15 320/132 |
| 2012/0025773 | A1 * | 2/2012 | Wang | H02J 7/00714 320/129 |
| 2014/0009122 | A1 | 1/2014 | Lo | |
| 2014/0077815 | A1 * | 3/2014 | Mattisson | G01R 19/0069 324/426 |
| 2016/0011273 | A1 * | 1/2016 | Mattisson | G01R 31/3835 320/162 |
| 2016/0064957 | A1 * | 3/2016 | Card | H02J 7/00711 320/129 |
| 2017/0104359 | A1 * | 4/2017 | Jung | H02J 7/0071 |
| 2017/0113564 | A1 * | 4/2017 | Unno | B60L 58/18 |
| 2017/0234930 | A1 | 8/2017 | Lee et al. | |
| 2017/0244255 | A1 * | 8/2017 | Luo | H02J 7/007182 |
| 2017/0310137 | A1 * | 10/2017 | Ha | H02J 7/0069 |
| 2018/0123354 | A1 * | 5/2018 | Lim | H01M 10/425 |
| 2018/0292461 | A1 | 10/2018 | Kim et al. | |
| 2019/0237974 | A1 * | 8/2019 | Dang | H02J 7/00714 |
| 2019/0252898 | A1 * | 8/2019 | Kim | H02J 7/007188 |
| 2019/0305367 | A1 | 10/2019 | Miyajima | |
| 2019/0334355 | A1 | 10/2019 | Kim et al. | |
| 2020/0020989 | A1 | 1/2020 | Li et al. | |
| 2020/0039376 | A1 | 2/2020 | Miyaki et al. | |
| 2020/0112178 | A1 * | 4/2020 | Jung | H02J 7/007182 |
| 2021/0066947 | A1 * | 3/2021 | Du | H02J 7/007182 |
| 2021/0119464 | A1 | 4/2021 | Kim et al. | |
| 2021/0165046 | A1 * | 6/2021 | Kim | G01R 31/36 |
| 2021/0210971 | A1 * | 7/2021 | Lim | H01M 10/425 |
| 2022/0158468 | A1 * | 5/2022 | Cha | B60L 3/12 |
| 2022/0255336 | A1 * | 8/2022 | Li | H02J 7/00712 |
| 2022/0311262 | A1 * | 9/2022 | Schmidt | H01M 10/052 |
| 2022/0329098 | A1 * | 10/2022 | Sherstyuk | H02J 7/007184 |
| 2022/0357407 | A1 * | 11/2022 | Qin | G01R 31/367 |
| 2023/0018424 | A1 * | 1/2023 | Na | H01M 10/446 |
| 2023/0036620 | A1 * | 2/2023 | Zuo | H02J 7/0071 |
| 2023/0042859 | A1 * | 2/2023 | He | H01M 50/417 |
| 2023/0105792 | A1 * | 4/2023 | Fukuoka | H01M 10/44 429/231.95 |
| 2023/0211701 | A1 * | 7/2023 | Luo | H01M 10/44 320/127 |
| 2023/0231401 | A1 * | 7/2023 | Zhou | H02J 7/007188 307/10.1 |
| 2023/0243894 | A1 * | 8/2023 | Kwon | G01R 31/374 324/431 |
| 2023/0266402 | A1 * | 8/2023 | Lee | H01M 10/052 324/434 |
| 2023/0278459 | A1 | 9/2023 | Nam et al. | |
| 2023/0280408 | A1 | 9/2023 | Nam et al. | |

FOREIGN PATENT DOCUMENTS

| | | |
|---|---|---|
| EP | 3291355 A1 | 3/2018 |
| EP | 4152472 A1 | 3/2023 |
| JP | 2018528573 A | 9/2018 |
| JP | 2019175564 A | 10/2019 |
| JP | 6809602 B2 | 1/2021 |
| KR | 101066379 B1 | 9/2011 |
| KR | 20180086591 A | 8/2018 |
| KR | 20190054512 A | 5/2019 |
| KR | 20190097626 A | 8/2019 |
| KR | 20200007668 A | 1/2020 |
| KR | 20210045706 A | 4/2021 |
| KR | 20220021277 A | 2/2022 |
| WO | 2022039505 A1 | 2/2022 |

OTHER PUBLICATIONS

Extended European Search Report including Written Opinion for Application No. 23792186.1 dated May 22, 2025. 7 pages.

* cited by examiner

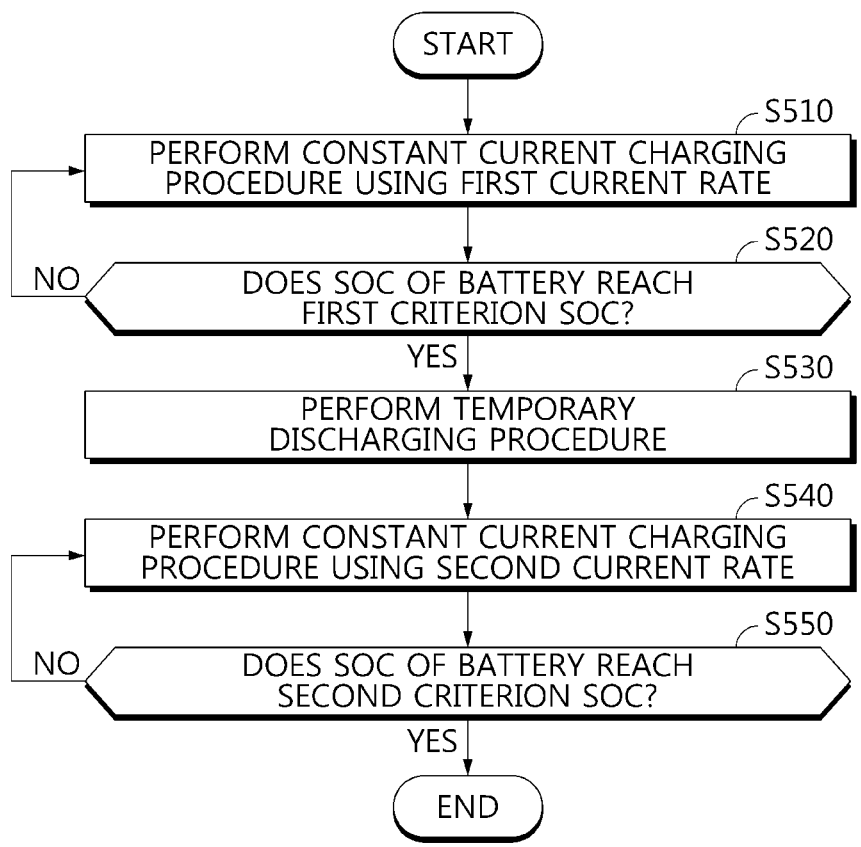

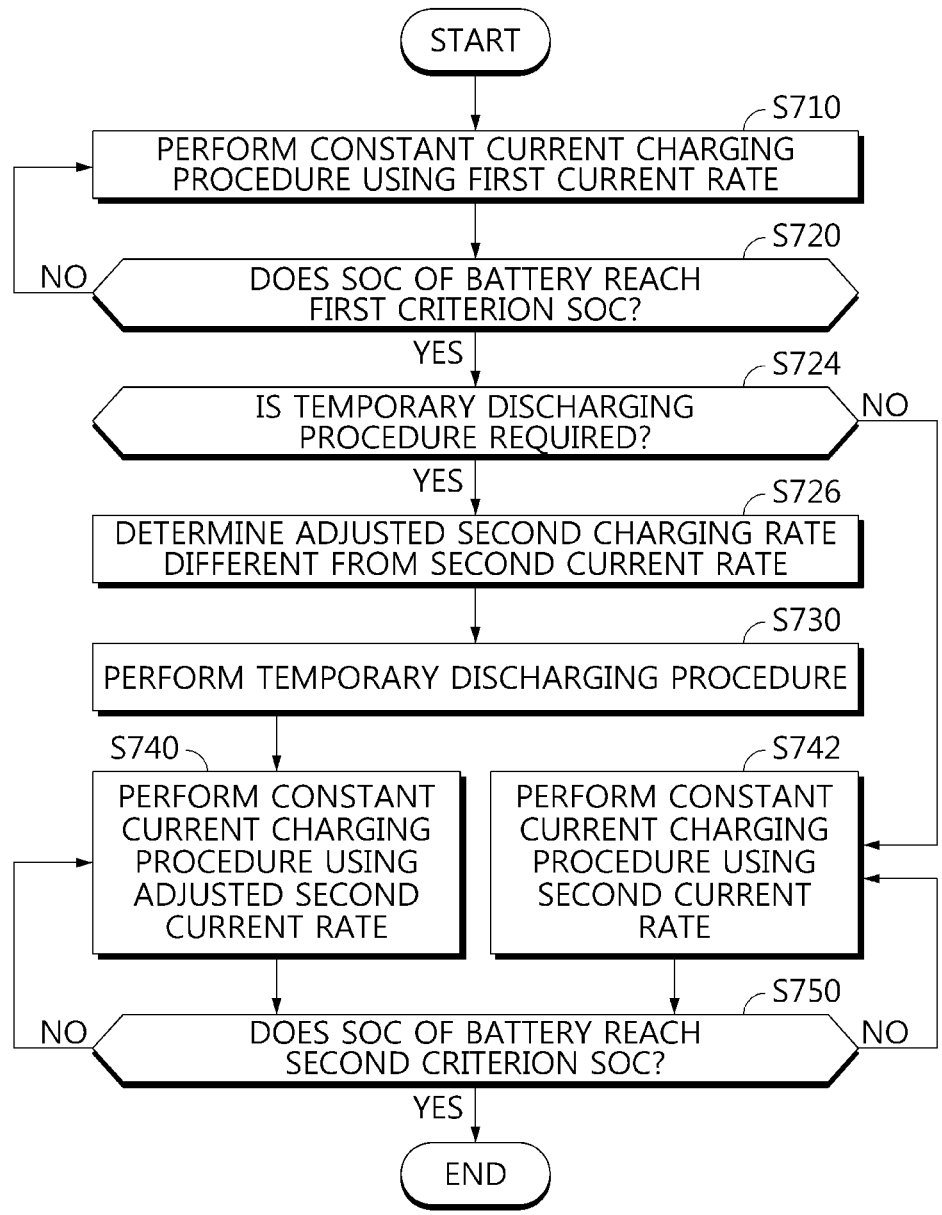

BATTERY CONTROL APPARATUS AND BATTERY CONTROL METHOD

CROSS-REFERENCE TO RELATED APPLICATIONS

The present application is a national phase entry under 35 U.S.C. § 371 of International Application No. PCT/KR2023/005332, filed on Apr. 19, 2023, which claims priority to Korean Patent Application No. 10-2022-0049483 filed on Apr. 21, 2022 in the Republic of Korea and Korean Patent Application No. 10-2023-0050321 filed on Apr. 17, 2023 in the Republic of Korea, all of which are incorporated herein by reference.

TECHNICAL FIELD

The present disclosure relates to a battery control apparatuses and methods. The apparatuses and methods may control a charging procedure using a multi-stage charging protocol so that a battery can be charged with high efficiency while suppressing lithium precipitation by setting at least one temporary discharging period during a multi-stage charging procedure in which the magnitude of a charging current changes at least once according to the SOC (State Of Charge) of the battery.

BACKGROUND

Recently, the demand for portable electronic products such as notebook computers, video cameras and portable telephones has increased sharply, and electric vehicles, energy storage batteries, robots, satellites, and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-discharging rate and high energy density.

A lot of research is being conducted on these batteries in terms of high-capacity and high-density, but the aspect of improving lifespan and safety is also important. To this end, it is necessary to suppress the decomposition reaction with the electrolyte on the surface of the electrode, and it is required to prevent overcharging and over-discharging.

In particular, it is necessary to prevent lithium plating (Li-plating), which is a phenomenon where lithium precipitation occurs on the surface of the negative electrode. When lithium precipitation occurs on the surface of the negative electrode, it causes side reactions with the electrolyte and changes in the kinetic balance of the battery, which causes battery degradation. In addition, the possibility of an internal short circuit of the battery increases as lithium precipitation occurs on the surface of the negative electrode, which causes a risk of ignition and explosion.

In the case of high-speed charging, plating of lithium on the surface of the negative electrode of the battery is accelerated compared to low-speed charging, so the charging efficiency and durability of the battery may decrease.

Therefore, it is necessary to develop a technology that can minimize lithium precipitation on the surface of the negative electrode when charging the battery and increase the efficiency of high-speed charging.

SUMMARY

Technical Problem

The present disclosure is designed to solve the problems of the related art, and therefore the present disclosure is directed to providing a battery control apparatus and method capable of reducing the amount of lithium precipitation or removing at least a part of the pre-precipitated lithium by performing a temporary discharging procedure between two adjacent charging stages during the process of charging a battery according to a multi-stage charging protocol.

In addition, the present disclosure is directed to providing a battery control apparatus and method for compensating for a decrease in SOC (State Of Charge) caused by a temporary discharging procedure by adjusting a current rate in a constant current charging procedure following the temporary discharging procedure.

These and other objects and advantages of the present disclosure may be understood from the following detailed description and will become more fully apparent from the embodiments of the present disclosure. Also, it will be easily understood that the objects and advantages of the present disclosure may be realized by the means shown in the appended claims and combinations thereof.

Technical Solution

A battery control apparatus according to aspects of the present disclosure comprises a measuring unit configured to measure a voltage of a battery and output a voltage measurement value representing the measured voltage; a memory for storing a multi-stage charging protocol data including a first current rate, a second current rate used in another constant current charging procedure following a constant current charging procedure using the first current rate, and a first criterion SOC associated with the first current rate, wherein the first criterion SOC is a value predetermined to prevent lithium precipitation of the battery in the constant current charging procedure using the first current rate; and a processor for identifying a SOC of the battery based on the voltage measurement value received from the measuring unit. The processor may be configured to perform a temporary discharging procedure, when the SOC of the battery reaches the first criterion SOC while the constant current charging procedure using the first current rate is in progress, determine an adjusted second current rate different from the second current rate, based on discharging information of the temporary discharging procedure, and perform a constant current charging procedure using the adjusted second current rate, after the temporary discharging procedure is finished.

The processor may be configured to determine the adjusted second current rate based on a SOC change amount of the battery during the temporary discharging procedure. The SOC change amount may be included in the discharging information.

The processor may be configured to determine the adjusted second current rate to be greater than the second current rate in order to compensate for the SOC change amount of the battery according to the temporary discharging procedure.

The memory may further store a second criterion SOC related to the second current rate. The second criterion SOC is a value predetermined to prevent lithium precipitation of the battery in the constant current charging procedure using the second current rate.

The processor may be configured to determine the adjusted second current rate further based on the first criterion SOC, the second criterion SOC and the second current rate.

The processor may be configured to calculate a criterion time expected to be taken until the SOC of the battery reaches the second criterion SOC from the first criterion SOC by assuming that the constant current charging procedure using the second current rate is performed immediately from a time point that the SOC of the battery reaches the first criterion SOC while the constant current charging procedure using the first current rate is in progress.

The processor may be configured to determine the adjusted second current rate so that the sum of (i) a time length of the temporary discharging procedure included in the discharging information and (ii) the time required for the SOC of the battery to reach the second criterion SOC by the constant current charging procedure using the adjusted second current rate immediately from an end time point of the temporary discharging procedure is equal to the criterion time.

The processor may be configured to determine the time length of the temporary discharging procedure to have a continuous or discrete negative correlation with the degree of use of the battery.

The processor may be configured to determine the adjusted second current rate so as to be proportional to the sum of a difference between the first criterion SOC and the second criterion SOC and the SOC change amount by the temporary discharging procedure and to be inversely proportional to a difference between the criterion time and the time length of the temporary discharging procedure included in the discharging information.

The processor may be configured to perform the temporary discharging procedure so that the battery is discharged with a constant current of a magnitude less than the first current rate.

The processor may be configured to determine the magnitude of the constant current for the temporary discharging procedure to have a continuous or discrete negative correlation with the degree of use of the battery.

The processor may be configured to determine whether the temporary discharging procedure needs to be performed, based on the degree of use of the battery, perform the temporary discharging procedure when the SOC of the battery reaches the first criterion SOC, in the case where it is determined that the temporary discharging procedure needs to be performed, and perform the constant current charging procedure using the second current rate without performing the temporary discharging procedure when the SOC of the battery reaches the first criterion SOC, in the case where it is determined that the temporary discharging procedure does not need to be performed.

A battery pack according to aspects of the present disclosure may comprise the battery control apparatus.

An electric vehicle according to aspects of the present disclosure may comprise the battery control apparatus.

A battery control method according to aspects of the present disclosure is executed by the battery control apparatus and comprises performing a temporary discharging procedure, when a SOC of a battery identified based on a voltage measurement value representing a measured voltage of the battery reaches a first criterion SOC associated with a first current rate while a constant current charging procedure using the first current rate is in progress, wherein the first criterion SOC is a value predetermined to prevent lithium precipitation of the battery in the constant current charging procedure using the first current rate; determining an adjusted second current rate different from a second current rate predetermined to be used in another constant current charging procedure following the constant current charging procedure using the first current rate, based on discharging information of the temporary discharging procedure, and performing a constant current charging procedure using the adjusted second current rate, after the temporary discharging procedure is finished.

Advantageous Effects

According to at least one of the embodiments of the present disclosure, by providing at least one temporary discharging procedure while the battery is being charged according to a multi-stage charging protocol, at least a part of lithium precipitated in the battery can be removed, and as a result, the charging efficiency can be improved. In this case, the temporary discharging procedure may proceed between two charging stages adjacent to each other.

In addition, according to at least one of the embodiments of the present disclosure, by adjusting the current rate in the constant current charging procedure following the temporary discharging procedure to compensate for the decrease in SOC (State Of Charge) caused by the temporary discharging procedure, the prolongation of the overall charging time due to the temporary discharging period can be suppressed.

In addition, according to at least one of the embodiments of the present disclosure, by adjusting at least one of the magnitude of the discharge current in the temporary discharging procedure and the time length of the temporary discharging procedure according to the degree of use of the battery, the lifespan of the battery can be extended.

The effects of the present disclosure are not limited to the effects mentioned above, and other effects not mentioned will be clearly understood by those skilled in the art from the description of the claims.

DESCRIPTION OF DRAWINGS

The accompanying drawings illustrate embodiments of the present disclosure and together with the foregoing disclosure, serve to provide further understanding of the technical features of the present disclosure, and thus, the present disclosure is not construed as being limited to the drawing.

FIG. 3b is an enlarged view showing a second section of FIG. 3a.

FIG. 5 is a flowchart schematically illustrating a battery control method according to embodiments of the present disclosure.

FIG. 7 is a diagram schematically showing a battery control method according to embodiments of the present disclosure.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, embodiments of the present disclosure will be described in detail with reference to the accompanying drawings.

Figure 1:
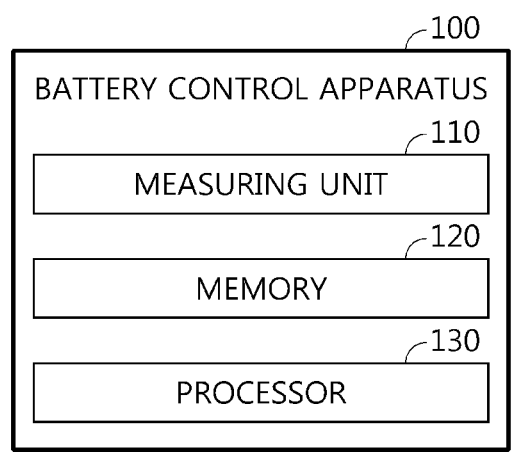
FIG. 1 shows a battery control apparatus according to embodiments of the present disclosure.

FIG. 1 shows a battery control apparatus according to embodiments of the present disclosure.

Referring to FIG. 1, a battery control apparatus 100 according to some embodiments of the present disclosure may include a measuring unit 110, a memory 120, and a processor 130.

The measuring unit 110 may measure at least one of voltage or current of the battery.

The measuring unit 110 may be configured to measure the voltage across both ends of the battery during charging or discharging of the battery. Here, the battery may mean one physically separable independent cell having a negative electrode terminal and a positive electrode terminal, or a battery module in which two or more cells are connected in series, in parallel, or in series and parallel. For example, a lithium-ion battery or a lithium polymer battery may be regarded as a battery. Hereinafter, for convenience of description, a battery will be described as meaning one independent cell. In various examples, the voltage of the battery measured by the measuring unit 110 may be at least one of an open circuit voltage (OCV) of the battery or a load voltage measured while a load is connected to the battery.

The measuring unit 110 may employ various voltage measurement techniques known at the filing time of the present disclosure. For example, the measuring unit 110 may include a voltage sensor known at the filing time of the present disclosure. In particular, when the battery control apparatus 100 according to the present disclosure is applied to a battery pack, a voltage sensor already included in the battery pack may be used as the measuring unit 110 according to the present disclosure.

The measuring unit 110 may be configured to measure current flowing through the battery during charging or discharging of the battery. In this case, the measuring unit 110 may measure the voltage applied across both ends of a shunt resistor when current flows and convert the measured voltage into current using Ohm's law. Alternatively, the measuring unit 110 may include another known current sensor such as a Hall sensor, and may measure current using the current sensor.

The memory 120 may be configured to store programs required to perform a multi-stage charging procedure for the battery, including multi-stage charging protocol data. As described above, the multi-stage charging protocol is a charging procedure in which the magnitude of the constant current is changed at least once, in at least a part of the entire SOC (State Of Charge) range from SOC representing the fully discharged state of the battery to SOC representing the full charged state. That is, the multi-stage charging protocol may refer to a charging procedure in which a current rate used for charging in each sub SOC range (which can be referred to as a 'stage') is pre-determined, when at least a part of the entire SOC range is divided into two or more sub SOC ranges. For reference, the SOC representing the fully discharged state is usually set to 0%, but may be set in advance to a value larger than 0% for the purpose of prolonging the lifespan of the battery. Similarly, the SOC representing the fully charged state is usually set to 100%, but may be predetermined to a value smaller than 100% for the purpose of prolonging the lifespan of the battery.

The multi-stage charging protocol data includes a first current rate, a second current rate used in another constant current charging procedure following a constant current charging procedure using the first current rate, and a first criterion SOC related to the first current rate. The first criterion SOC is a value predetermined to prevent lithium precipitation of the battery in the constant current charging procedure using the first current rate.

The memory 120 may store at least one criterion SOC. Here, the criterion SOC can be referred to as SOC at which lithium is expected to precipitate on the negative electrode of the battery when the battery is charged at a predetermined current rate (C-rate). For example, if the multi-stage charging procedure is a sequential flow of three constant current charging procedures with different current rates, there are two criterion SOCs. That is, the number of criterion SOCs pre-stored in the memory 120 may be less than the number of constant current charging procedures included in the multi-stage charging procedure by 1.

The memory 120 may store information about the SOC of the battery, at which lithium is precipitated on the negative electrode of the battery based on the current rate. In charging the battery with a constant current, the SOC at which lithium precipitation occurs on the negative electrode of the battery may vary depending on the magnitude of the constant current, that is, the current rate. For example, the higher the current rate used for constant current charging, the smaller the SOC at which lithium precipitation occurs. In this way, through a charging process for a battery designed to have the same characteristics as a battery to be controlled in advance, information on a current rate and an SOC at which lithium is precipitated according to the current rate can be experimentally obtained in advance. For example, in a lithium secondary battery in a three-electrode form that includes a negative electrode, a positive electrode and a criterion electrode, information on the SOC at which lithium is precipitated can be obtained in advance by separating the potential of only the negative electrode and testing whether or not lithium precipitation occurs while changing the current rate. Each criterion SOC stored in the memory 120 represents the relationship between the current rate and the lithium precipitation SOC (criterion SOC) obtained as described above. The memory 120 may store curve data and/or a lookup table representing the relationship between the current rate and the criterion SOC.

For example, it is assumed that the multi-stage charging procedure includes a constant current charging procedure using a first current rate and a following constant current charging procedure using a second current rate. In this case, the memory 120 may store the first criterion SOC. The first criterion SOC becomes the end condition of the constant current charging procedure using the first current rate, that is, the criterion for converting the magnitude of the constant current used in the constant current charging procedure from the first current rate to the adjusted second current rate.

The first criterion SOC may be a limit value in which lithium precipitation does not occur on the negative electrode of the battery or the amount of lithium precipitation becomes less than a certain amount during constant current charging using the first current rate from when the SOC of the battery is less than the first criterion SOC. That is, when the SOC of the battery reaches the first criterion SOC by constant current charging using the first current rate, the lithium precipitation of the battery may start or the amount of lithium precipitation by constant current charging using the first current rate may exceed a certain amount.

It is assumed that the multi-stage charging procedure further includes a constant current charging procedure using a third current rate following the constant current charging procedure using the second current rate. In this case, the memory 120 may further store a second criterion SOC. The second criterion SOC becomes the criterion for converting the magnitude of the constant current used in the constant current charging procedure from the second current rate to the third current rate. The second criterion SOC may be a limit value at which lithium precipitation does not occur on the negative electrode of the battery or the amount of lithium precipitation is less than a certain amount during constant current charging using the third current rate, after constant current charging using the second current rate is completed.

The memory 120 may store data required for each component of the battery control apparatus 100 to perform operations and functions, or data generated in the process of performing programs or operations and functions. The memory 120 may be internal or external to the processor 130, and may be connected to the processor 130 by various well-known means. The memory 120 may store at least one program, application, data, or instructions executed by the processor 130. The type of memory 120 is not particularly limited as long as it is known information storage means capable of recording, erasing, updating, and reading data. As an example, the memory 120 may be implemented as at least one of a flash memory type, a hard disk type, a solid state disk (SSD) type, a solid disk drive (SDD) type, a multimedia card micro type, a random access memory (RAM), and a static RAM (SRAM), a ROM (Read Only Memory), an EEPROM (Electrically Erasable Programmable Read Only Memory), or a PROM (Programmable Read Only Memory), but the present disclosure is not necessarily limited to the specific form of the memory 120. Also, the memory 120 may store program codes in which processes executable by the processor 130 are defined.

The processor 130 may receive the voltage measurement value of the battery from the measuring unit 110. For example, the processor 130 may receive the voltage value of the battery from the measuring unit 110 in real time or periodically at regular time intervals.

The processor 130 may identify the current SOC (latest SOC) of the battery based on the received voltage measurement value while the multi-stage charging procedure for the battery is in progress. That is, the processor 130 may monitor the SOC of the battery in real time at predetermined time intervals during the multi-stage charging procedure.

The processor 130 may identify the current SOC of the battery in various ways. For example, the memory 120 further includes first mapping information in which the SOC corresponding to the voltage measurement value (e.g., OCV) is mapped, and the processor 130 may receive the voltage measurement value from the measuring unit 110 and then access the memory 120 to read SOC corresponding to the received voltage measurement value. Alternatively, the memory 120 stores formulas (e.g., ampere counting, extended Kalman filter) for calculating the SOC of the battery based on at least one of a voltage measurement value or a current measurement value output by the measuring unit 110, and the processor 130 may calculate SOC through formulas stored in the memory 120.

For example, the processor 130 may identify the open circuit voltage of the battery according to the voltage measurement value using an equivalent circuit model of the battery. Here, the memory 120 may further include second mapping information in which the SOC corresponding to the open circuit voltage of the battery is mapped, and the processor 130 may access the memory 120 and read the SOC corresponding to the open circuit voltage. In another example, the processor 130 may use the extended Kalman filter stored in the memory 120 to identify the current SOC of the battery. Here, since the extended Kalman filter is an algorithm based on an equivalent circuit model or an electrochemical reduced order model (ROM) and is widely known in the art to which the present disclosure belongs, a detailed description thereof will be omitted.

Alternatively, the measuring unit 110 may calculate the SOC change amount by integrating the measurement value of the current applied while the battery is being charged over time, and identify the SOC of the battery by adding the calculated SOC change amount to the initial SOC.

In this way, the processor 130 may receive the voltage measurement value of the battery from the measuring unit 110, obtain an SOC corresponding to the received voltage measurement value, and identify the obtained SOC as the current SOC of the battery.

The processor 130 may be configured to perform a temporary discharging procedure for discharging the battery for a specified period of time, when the SOC of the battery reaches the first criterion SOC during constant current charging using the first current rate. That is, a temporary discharging period exists between the constant current charging procedure using the first current rate and the constant current charging procedure using the adjusted second current rate described later. The processor 130 may recognize that the battery has reached the first criterion SOC by identifying the latest SOC of the battery in real time or at predetermined time intervals while the battery is being charged at the first current rate. While the battery is being charged at the first current rate, the processor 130 may obtain the first criterion SOC stored in the memory 120 and compare the first criterion SOC with the SOC of the battery in real time or at regular time intervals. When recognizing that the SOC of the battery corresponds to the first criterion SOC, the processor 130 may be configured to discharge the battery for a specified period of time. For example, when the SOC of the battery reaches 70%, which is the first criterion SOC, during the constant current charging process using the first current rate, the processor 130 may be configured to stop charging and discharge the battery for a certain period of time (e.g., 6 seconds). At this time, the battery may be discharged with a constant current having a predetermined magnitude.

The processor 130 may be configured to perform a constant current charging procedure using the second current rate adjusted to be different from the original second current rate after the battery is discharged for the specified time.

Figure 2:
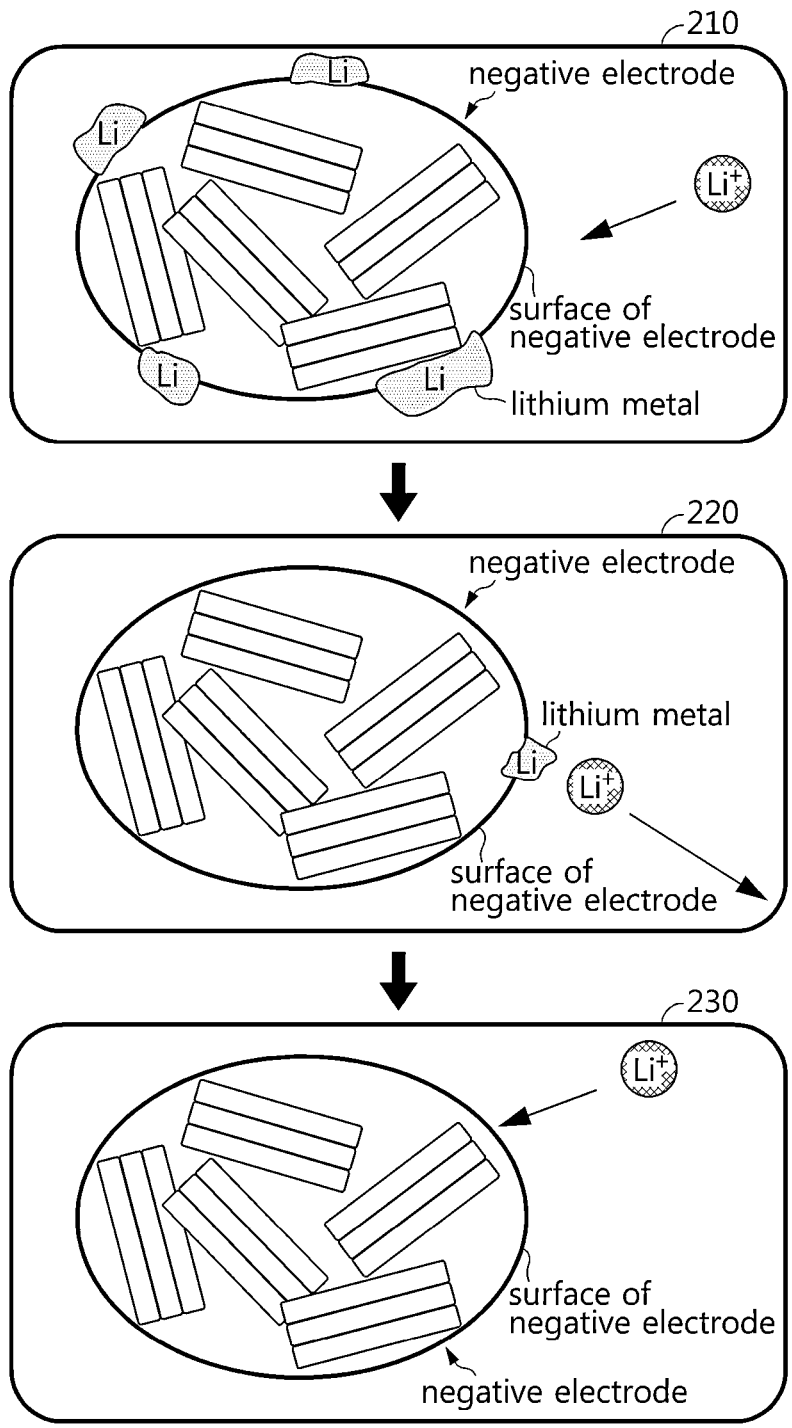
FIG. 2 shows an example of precipitation of lithium while the battery is being charged.

FIG. 2 shows an example of precipitation of lithium while the battery is being charged.

The processor 130 may be configured to charge the battery according to a multi-stage charging procedure. As described above, when the SOC of the battery reaches the first criterion SOC during the constant current charging procedure using the first current rate, lithium can be precipitated on the surface of the negative electrode. Referring to the first diagram 210, it is possible to check that some metal lithium is already precipitated on the surface of the negative electrode of the battery, when a battery that has been degraded for various reasons reaches the first criterion SOC during constant current charging using the first current rate.

The processor 130 may be configured to discharge a battery that has reached the first reference SOC for a specified period of time by the constant current charging procedure using the first current rate. Referring to the second diagram 220, as the battery is temporarily discharged between the constant current charging procedure using the first current rate and the constant current charging procedure using the adjusted second current rate, it is shown that the hysteresis accumulated by the charging current is resolved by discharge current which is the reverse direction of the charging current, and the lithium precipitated on the surface of the negative electrode of the battery is removed. That is, through the temporary discharging procedure, the progress of lithium precipitation intensified in the constant current charging procedure using the first current rate is resolved or at least slowed down. Accordingly, compared to the conventional method in which the constant current charging procedure using the second current rate is started immediately after the constant current charging procedure using the first current rate is completed, charging efficiency and safety of the battery can be improved.

Discharging information of the temporary discharging procedure may be stored in the memory 120. Here, the discharging information includes at least one of a time length of the temporary discharging procedure, a magnitude of the constant current used for discharging, or an SOC change amount due to discharging.

The processor 130 may be configured to charge the battery at a second current rate different from the first current rate after the temporary discharging procedure associated with the second diagram 220 is finished. For reference, the second current rate (e.g. 1.5 C) may be smaller than the first current rate (e.g. 2.5 C). The current rate used in each constant current charging procedure included in the multi-stage charging procedure may be appropriately set in advance according to various conditions such as the type or specifications of the battery and the specifications of a device in which the battery is used.

Referring to the third diagram 230, it is shown that the amount of lithium precipitated on the negative electrode is reduced compared to that shown in the first diagram 210, when the constant current charging procedure using the second current rate starts.

After the constant current charging using the first current rate is finished, the processor 130 may charge the battery at a second current rate smaller than the first current rate, so that the amount of lithium precipitation generated while another charging procedure following the constant current charging procedure using the first current rate is in progress is reduced or the rate of lithium precipitation is reduced.

According to the components of the present disclosure, at least a part of the lithium precipitation may be removed when the battery is charged. The processor 130 may discharge the battery for a specified period of time while the battery is being charged, alleviating the hysteresis caused by the charging current and removing at least a part of the already precipitated lithium, so that the amount of charge of the battery can be estimated more accurately and easily.

The processor 130 is operatively connected to other components of the battery control apparatus 100 and may control various operations of the battery control apparatus 100. The processor 130 may perform various operations of the battery control apparatus 100 by executing one or more instructions stored in the memory 120. The processor 130 may optionally include a processor, application-specific integrated circuit (ASIC), chipset, logic circuit, register, communication modem, data processing device, etc. known in the art to execute various control logics performed in the present disclosure. Also, when the control logic is implemented as software, the processor 130 may be implemented as a set of program modules. At this time, the program module may be stored in the memory 120 and executed by the processor 130.

In particular, when the battery control apparatus 100 is implemented in a form included in a battery pack, the battery pack may include a control device referred to by terms such as a micro controller unit (MCU) or a battery management system (BMS). At this time, the processor 130 may be implemented by a component such as an MCU or BMS included in such a general battery pack.

In this specification, terms such as 'do . . . ' or 'configured to . . . ' regarding the operation or function of the processor 130 may include the meaning of 'programmed to . . . '.

According to some embodiments, unlike the first current rate used for constant current charging in the SOC range of the first criterion SOC or less from the fully discharged state, an adjusted second current rate may be used in the constant current charging in the SOC range of the first criterion SOC or higher instead of the second current rate. The processor 130 may determine the adjusted second current rate to be used for a constant current charging procedure, which is initiated under the condition that the temporary discharging procedure is finished, based on the change amount (decrease amount) of the SOC value of the battery according to the temporary discharge performed from the time that the SOC of the battery reaches the first criterion SOC. This will be described in detail with reference to FIGS. 3a and 3b.

Figure 3A:
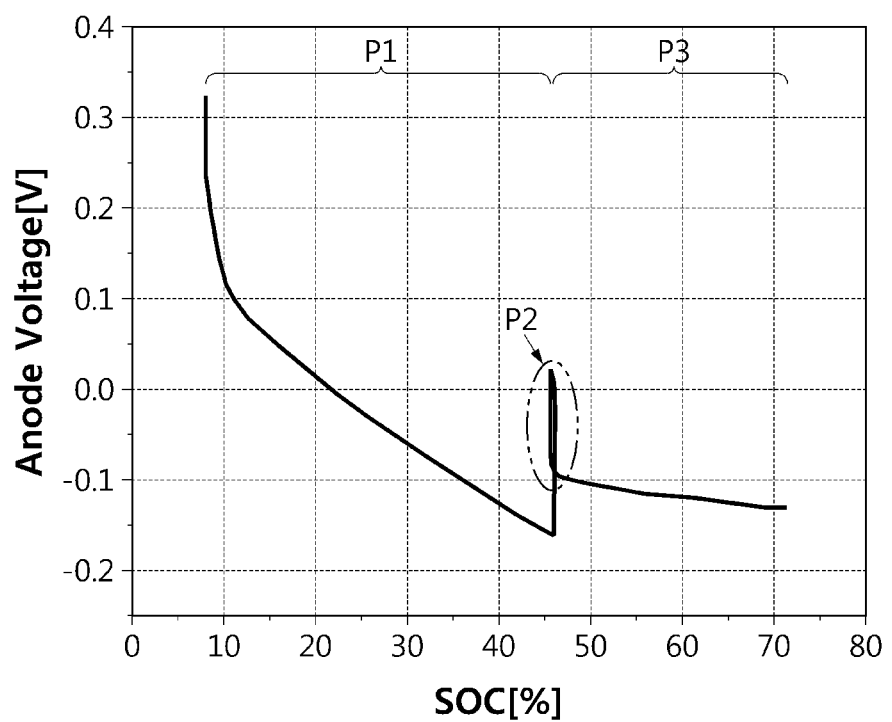
FIG. 3a is a graph showing a negative electrode voltage according to SOC in the process of charging the battery according to the multi-stage charging protocol.
Figure 3B:
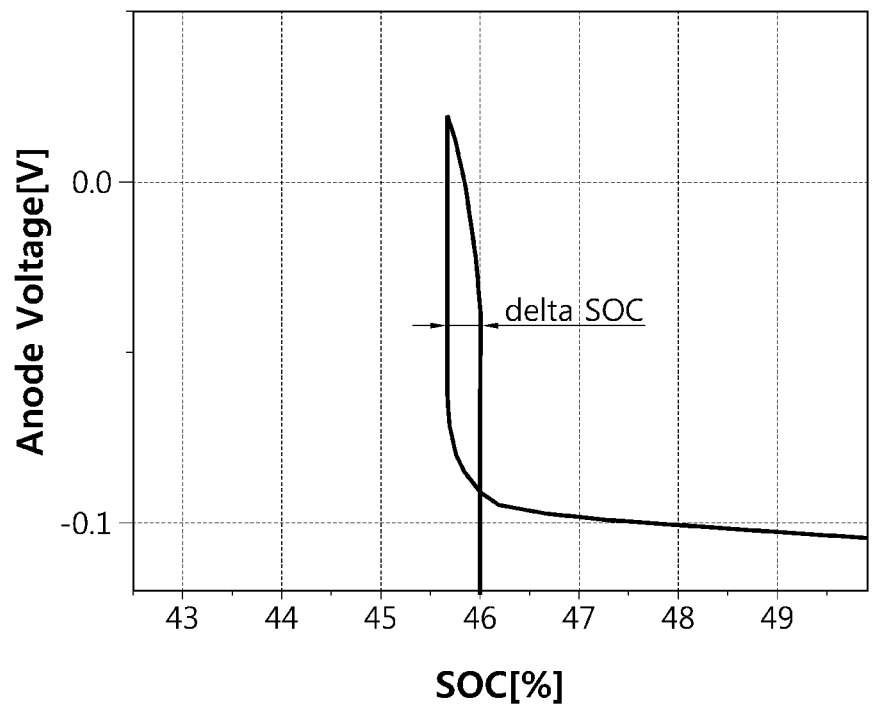

FIG. 3a is a graph showing a negative electrode voltage according to SOC in the process of charging the battery according to the multi-stage charging protocol. FIG. 3b is an enlarged view showing a second section of FIG. 3a.

Referring to FIG. 3a, the X-axis value of the graph may represent SOC (%) (or SOC value (%)) of the battery, and the Y-axis value of the graph may represent the voltage (or voltage value) of the negative electrode of the battery. Referring to FIG. 3, it can be seen that the voltage of the negative electrode of the battery gradually decreases while charging the battery.

The first section P1 may correspond to a section in which the battery is charged at the first current rate under the control of the processor 130. The second section P2 may correspond to a section in which the battery is discharged by the processor 130 with a constant current having a magnitude fixed or determined by the processor 130 during at least a part of the time between the first section P1 and the third section P3. The third section P3 may correspond to a section in which the battery is charged at the adjusted second current rate lower than the first current rate under the control of the processor 130. In some embodiments, a predetermined reset time may be provided between the end time point of the first section P1 and the start time point of the second section P2 and/or between the end time point of the second section P2 and the start time point of the third section P3. The magnitude of the constant current in the temporary discharging procedure may be less than or equal to the first current rate and greater than or equal to the adjusted second current rate. For example, the first current rate may be 1 C, the adjusted second current rate may be 0.8 C, and the magnitude of the constant current in the temporary discharging procedure may be 0.9 C, but this is an example and the present disclosure is not construed to be limited thereto.

Referring to first section P1, when the battery is charged at the first current rate, the processor 130 may obtain the first criterion SOC in which lithium is precipitated from the memory 120, and charge the battery up to the first criterion SOC at the first current rate. For example, in the implementation graph of FIG. 3a, the first criterion SOC may be 46%. The processor 130 may charge the battery at the first current rate until the SOC of the battery reaches the first criterion SOC from an arbitrary SOC smaller than the first criterion SOC.

Referring to second section P2, if the processor 130 recognizes that the SOC of the battery corresponds to the first criterion SOC, the processor 130 may stop the charging operation and allow the battery to be discharged for a specified period of time. In the second section P2, as the battery is discharged for a specified period of time, at least a part of lithium already precipitated due to degradation according to use or due to the constant current charging procedure using the first current rate can be removed.

Referring to FIG. 3b, it is shown that the SOC of the battery and the negative electrode voltage change as the battery is discharged. Here, in FIG. 3b, 'delta SOC' may represent SOC change (change amount of SOC) due to discharge in the second section P2. The processor 130 may discharge the battery for a specified time with a constant current having the same magnitude as the first current rate in the second section P2. For example, when the first current rate is 0.5 C, the magnitude of the constant current used for discharging in the second section P2 may also be 0.5 C. In this way, when the battery is discharged with a constant current equal to the current rate of the first section P1 with respect to the second section P2, the processor 130 may easily calculate the change amount of the SOC in the second section P2. However, in some embodiments, the processor 130 may discharge the battery at a value greater than the first current rate in order to quickly alleviate the prognostic symptom of lithium precipitation that is intensified in the constant current charging procedure using the first current rate, in consideration of degradation of the battery.

The SOC of the battery decreases due to the discharging procedure in the second section P2. Specifically, the SOC change amount of the battery in the second section P2 may be derived using Equation 1 below.

$$\text{delta } SOC = t1 \times \frac{100}{60} \times a1 \qquad \text{<Equation 1>}$$

In Equation 1, delta SOC is the SOC change amount when the battery is discharged for t1 with a specified constant current. t1 means the time to discharge the battery (the designated time=the time length of the temporary discharging procedure). '60' described as the numerator of Equation 1 is to convert minute used as the unit of t1 to hour in accordance with Ah (Ampere-hour) related to the unit of a1, which is the magnitude of the constant current used in the discharging procedure, and '100' is to express in %. Therefore, '60' and '100' in Equation 1 should be understood as example coefficients only. For example, according to Equation 1, when the battery is discharged with a constant current of 2.5 C for 5 seconds, it can be determined that delta SOC=(5/60)×100/60×2.5=about 0.347%.

Referring to the third section P3 of FIG. 3a, the processor 130 may charge the battery at the adjusted second current rate different from the first current rate after discharging the battery. In this case, the processor 130 may be configured to determine the adjusted second current rate by adjusting the original second current rate based on the change in the SOC value of the battery according to the temporary discharging procedure (estimate of the SOC reduction amount according to Equation 1). For example, the processor 130 may allow the SOC of the battery to be charged up to the second criterion SOC at the adjusted second current rate during the third section P3, while compensating for the reduced SOC due to the discharge of the battery.

More specifically, the processor 130 may be configured to identify a change amount of the SOC value of the battery after the battery is discharged, and determine the adjusted second current rate so that the identified SOC change amount can be compensated for.

The processor 130 may control the battery charging process according to a preset charging schedule (charging order according to the multi-stage charging protocol). The processor 130 may charge the battery to correspond to a preset charging schedule while compensating for the SOC change amount due to discharge in the second section P2 of the battery. Hereinafter, embodiments of determining the adjusted second current rate so that the SOC change amount during discharging can be compensated for when the processor 130 has a preset charging schedule will be described.

The processor 130 may determine the adjusted second current rate to correspond to a preset charging time based on the predetermined charging schedule. For example, a time required until charging is finished may be determined in advance according to the predetermined charging schedule. The processor 130 may determine the adjusted second current rate so that the time required for charging up to the second criterion SOC is the same as the time required according to the predetermined charging schedule (the temporary discharging procedure does not exist) while having a time required for discharging. Therefore, the processor 130 can alleviate the lithium precipitation phenomenon (remove at least a part of lithium) by discharging for a specified time while charging the battery without increasing the total charging time, and accordingly, the charging efficiency of the battery can be improved.

Charging the battery with a preset charging schedule may mean that the battery is charged at the first current rate until the battery SOC reaches the first criterion SOC, and the battery is charged at the second current rate from the first criterion SOC to the second criterion SOC without a temporary discharging procedure.

The memory 120 may store the second criterion SOC in which lithium is expected to precipitate when charging at the second current rate to correspond to a preset charging schedule. The memory 120 may store the second criterion SOC together with the first criterion SOC in which lithium is expected to precipitate on the negative electrode of the battery when charging at the first current rate to correspond to a preset charging schedule. The first criterion SOC and the second criterion SOC are stored in advance in the memory 120, and the processor 130 may access the memory 120 to obtain the first criterion SOC and the second criterion SOC.

As a more specific example, the processor 130 may have a preset charging schedule in which, if the battery is charged at 2.5 C so that the SOC of the battery reaches 46%, the current rate is immediately changed to charge at 1.5 C so that the SOC of the battery reaches 62.1%. At this time, 2.5 C may correspond to the first current rate, 46% may correspond to the first criterion SOC, 1.5 C may correspond to the second current rate, and 62.1% may correspond to the second criterion SOC.

The processor may be configured to identify the second criterion SOC and calculate a criterion time expected to be required until the SOC of the battery reaches the second criterion SOC from the first criterion SOC, when it is assumed that the battery is charged at the second current rate. According to the preset charging schedule, the processor 130 may derive the time required to charge the battery at a specific current rate (second current rate, etc.) using Equation 2 below, based on information about the criterion SOC obtained from memory 120.

$$t2 = \frac{60}{b1} \times \frac{c1}{100} \qquad <\text{Equation 2}>$$

In Equation 2, b1 means the current rate and c1 means the SOC change amount. t2 derived by Equation 2 means the time required for the SOC of the battery to increase by c1 when the battery is charged at the current rate of b1. In Equation 2, the unit of t2 is minutes for example. That is, according to the Equation 2, the processor 130 may expect that about 6.44 minutes are required to reach 62.1%, which is the second criterion SOC, if the battery is charged at the second current rate of 1.5 C right after the SOC of the battery reaches 46%, which is the first criterion SOC, according to the preset charging schedule. Here, the calculated 6.64 minutes may be the criterion time.

The processor 130 may determine the adjusted second current rate so that the remaining charging time required for the SOC (less than the first criterion SOC) of the battery at the end time point of the second section P2, that is, the temporary discharging procedure, to reach the second criterion SOC corresponds (becomes identical) to the criterion time. That is, the processor 130 may determine the adjusted second current rate so that that the sum of the time length of the temporary discharging procedure performed at the end of the constant current charging procedure using the first current rate and the time required for the constant current charging procedure using the adjusted second current rate is not longer than the time required for the SOC of the battery to reach the second criterion SOC after the constant current charging procedure using the original second current rate starts immediately without discharging from the end time point (SOC of the battery=first criterion SOC) of the constant current charging procedure using the first current rate.

The processor 130 may be configured to determine the adjusted second current rate to correspond (be identical) to the criterion time based on (i) the difference between the first criterion SOC and the second criterion SOC, (ii) the SOC change amount during the second section P2, and (iii) the time length of the temporary discharging procedure. That is, the adjusted second current rate may be proportional to the sum of the difference between the first criterion SOC and the second criterion SOC and the SOC change amount due to discharge, and may be inversely proportional to the difference between the criterion time and the designated time.

Specifically, the processor 130 needs to charge the battery by 16.1% for 6.44 minutes when charging the battery at the second current rate according to a preset charging schedule (the temporary discharging period does not exist).

When the battery is charged in the order of proceeding with the temporary discharging procedure after the constant current charging procedure using the first current rate and then proceeding with the constant current charging procedure again, the processor 130 may determine the adjusted second current rate to compensate for the time length (e.g., 5 seconds=about 0.083 minutes) of the temporary discharging procedure and the SOC value (e.g., about 0.347%) reduced by the temporary discharging procedure. That is, in order to compensate for the SOC reduced in the second section P2, the processor 130 may determine the adjusted second current rate, which is a constant current value of a magnitude capable of charging the battery by 16.447% (16.1%+0.347%) for about 6.357 minutes (6.44 minutes– 0.083 minutes). For example, the processor 130 may determine the adjusted second current rate to be about 1.552 C using Equation 2. Therefore, even if a temporary discharging period according to the second section P2 is added after the constant current charging procedure by the first current rate is completed according to the present disclosure, there is an advantage that the total charging time from the time point at which the battery SOC reaches the first criterion SOC to the time point at which the battery SOC reaches the second criterion SOC may be maintained at substantially the same level.

In particular, the processor 130 may be configured to determine the adjusted second current rate to have a value smaller than the first current rate and larger than the second current rate.

In addition, although the processor 130 has been described based on embodiments in which the current rate is changed once in the multi-stage charging procedure, the number of times the processor 130 changes the current rate is not interpreted to be limited thereto. For example, the processor 130 may change the current rate twice or more depending on the type of load using the battery. Specifically, when the battery control apparatus 100 according to the present disclosure is applied to an electric vehicle, the processor 130 may change the current rate 10 or more times in a manner of compensating for the SOC change amount according to the aforementioned discharge.

In particular, if the battery is repeatedly charged and discharged above a certain level, the amount of lithium precipitated on the negative electrode may increase due to degradation. Since the criterion SOC stored in memory 120 is data based on a battery in an initial state, when the criterion SOC is applied to a degraded battery, the charging efficiency is inevitably lower than that of a new battery. For example, if the battery is degraded to a certain extent, even if the battery is charged with a constant current at the first current rate, lithium precipitation may already begin to occur at an SOC smaller than the first criterion SOC. Therefore, when the battery charging schedule is set using the criterion SOC based on the initial state (new product state) of the battery, an error may occur in the charging amount actually charged in the battery. According to some embodiments of the present disclosure, by removing lithium by performing a discharging operation during charging, the actual charging amount of the battery can be accurately estimated.

In addition, when the temporary discharging procedure is initiated in an SOC lower than the first criterion SOC, the effect of improving the charging efficiency according to the temporary discharging procedure may not be obtained because there is no or insignificant amount of lithium already precipitated in the constant current charging procedure using the first current rate. The processor 130, according to some embodiments, may allow the battery to be discharged on the condition that the first criterion SOC is reached, so that the lithium precipitated in the constant current charging procedure using the first current rate can be removed as quickly as possible, thereby improving the charging efficiency of the battery.

Figure 4A:
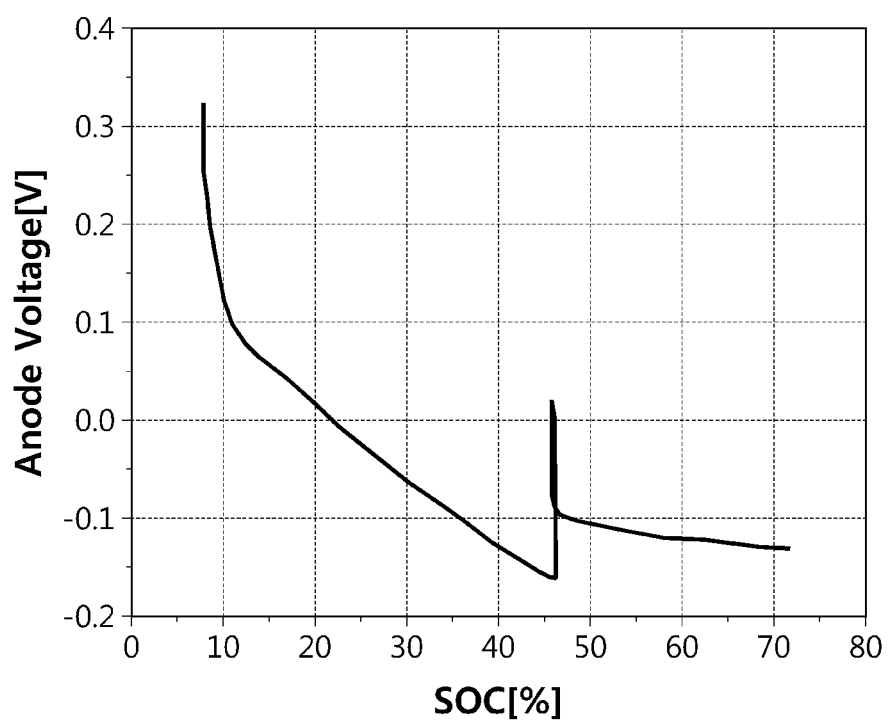
FIG. 4a is a graph showing a negative electrode voltage according to SOC in the process of charging the battery by a processor according to embodiments of the present disclosure.
Figure 4B:
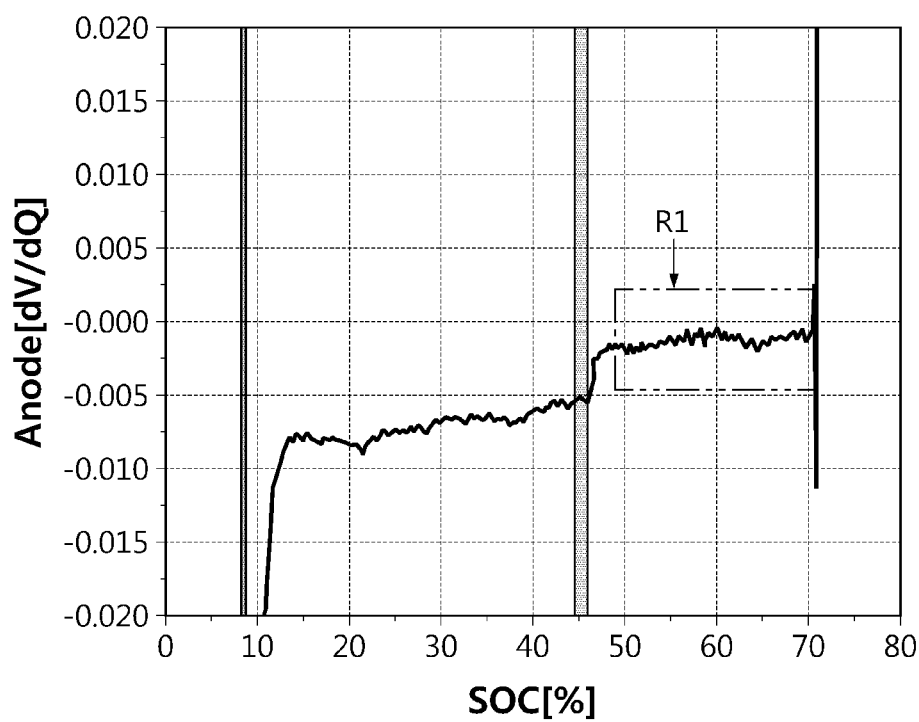
FIG. 4b is a graph showing dV/dQ of a negative electrode according to SOC in the process of charging the battery by the processor according to embodiments of the present disclosure.
Figure 4C:
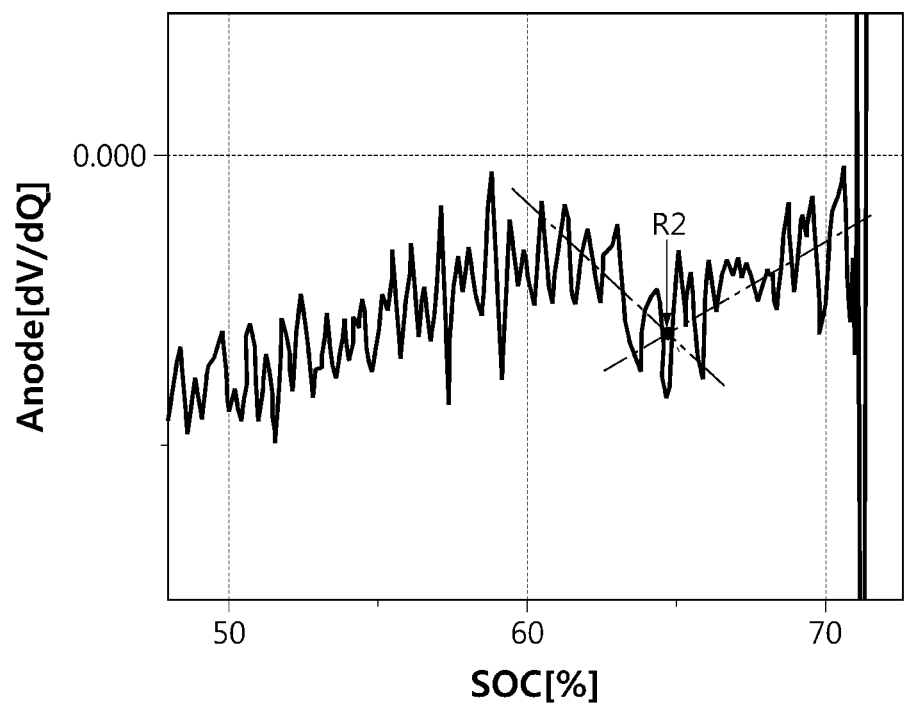
FIG. 4c is an enlarged view showing a specific region of FIG. 4b.

FIG. 4a is a graph showing a negative electrode voltage according to SOC in the process of charging the battery by a processor according to some embodiments of the present disclosure. FIG. 4b is a graph showing dV/dQ of a negative electrode according to SOC in the process of charging the battery by the processor according to some embodiments of the present disclosure. FIG. 4c is an enlarged view showing a specific region R1 of FIG. 4b.

The X-axis of the first graph of FIG. 4a represents the SOC of the battery, and the Y-axis represents the negative electrode voltage of the battery. In the second graph of FIG. 4b, the X-axis represents the SOC of the battery, and the Y-axis represents dV/dQ of the negative electrode of the battery.

Referring to the first graph of FIG. 4a, the processor 130 may charge the battery at a current rate of 2.5 C until the SOC of the battery reaches 46%. If recognizing that the current SOC of the battery corresponds to 46%, the processor 130 may discharge the battery for the specified time.

In particular, the processor 130 may discharge the battery for the specified time with a constant current having the same value as the first current rate. According to this, the processor 130 may easily calculate the SOC change amount due to the discharge over the specified time.

Referring to the first graph of FIG. 4a, as in FIG. 3a, a region where the voltage value of the negative electrode and the SOC of the battery is changed as the battery is discharged for the designated time (e.g., 5 seconds) from the time when the SOC of the battery reaches the first criterion SOC is shown. This has already been described with reference to FIGS. 3a and 3b, and overlapping portions are omitted.

The processor 130 may compensate for the SOC value that changes according to the discharging time and determine the adjusted second current rate to correspond to the charging time according to the predetermined charging schedule. The processor 130 may immediately charge the battery at 1.552 C at the end of the temporary discharging procedure.

The second graph in FIG. 4b is a differential curve obtained by differentiating the curve of the first graph, that is, a graph in which the voltage of the negative electrode is differentiated with respect to SOC (or capacity Q). The specific region R1 illustrates a dV/dQ of the negative electrode of the battery in the SOC range preset in the multi-stage charging protocol so that the constant current charging procedure using the adjusted second current rate proceeds. Referring to the diagram of FIG. 4c in which the specific region R1 of the second graph is enlarged, the sudden change point R2 corresponding to the point (e.g., minimum point, maximum point) where the trend (slope) of the graph changes rapidly is plotted. The sudden change point R2 may correspond to a point where dV/dQ of the negative electrode rapidly changes due to precipitation of lithium on the negative electrode.

The processor 130 may be configured to identify this sudden change point R2. At this time, the processor 130 may access the memory 120 to read related data or perform a related formula or calculation process in order to identify such a sudden change point R2.

The processor 130 may recognize dV/dQ of the negative electrode at predetermined time intervals while the battery is being charged. Based on the recognized dV/dQ, the processor 130 may identify a change tendency of the dV/dQ value. In the process of recognizing dV/dQ of the negative electrode at predetermined time intervals, the processor 130 may identify a point where the change amount of dV/dQ is suddenly changed. For example, the processor 130 may obtain information indicating dV/dQ at a predetermined time interval and calculate a change amount with the previous dV/dQ. The processor 130 may detect, as the sudden change point R2, a specific point at which the dV/dQ value decreases with a change amount greater than or equal to a threshold value compared to the previous dV/dQ and then increases with a change amount equal to or greater than the threshold value. The sudden change point R2 is related to the SOC in which the aforementioned rapid change in dV/dQ occurs due to lithium precipitated on the negative electrode.

In addition, the sudden change point R2 is a SOC in which lithium is precipitated on the negative electrode of the battery while performing constant current charging at the adjusted second current rate determined to compensate for the SOC decrease according to the progress of the temporary discharging procedure through the constant current charging using the first current rate and the temporary discharging procedure, and may be a SOC higher than the second criterion SOC (e.g., 62.1%) predetermined so that lithium precipitation occurs when the constant current charging procedure using the second current rate is performed without the temporary discharging procedure. That is, at the end of the constant current charging procedure using the first current rate, the processor 130 may delay lithium precipitation during battery charging and allow the battery to be charged with high efficiency by changing the multi-stage charging protocol so that the temporary discharging procedure and the constant current charging procedure using the adjusted second current rate proceed instead of the constant current charging procedure using the second current rate.

In addition, the processor 130 may recognize the degree of use (e.g., the number of charge/discharge cycles, capacity retention rate) of the battery by utilizing various well-known battery state detection algorithms, and determine the length of time to discharge the battery based on the recognized degree of use. For example, as the battery is degraded by repeated use of the battery, the amount of lithium precipitated on the negative electrode of the battery may increase. As the amount of precipitation lithium increases, it is necessary to increase the time length of the second section P2 where the battery is discharged.

When the processor 130 recognizes that the degree of use (e.g., the number of charge/discharge cycles, degree of degradation) of the battery is greater than a threshold value, the time length of the temporary discharging procedure may be determined to a time (e.g., 6 seconds) longer than the set time (e.g., 5 seconds). Alternatively, if the processor 130 recognizes that the degree of use of the battery is smaller than a reference, the time length of the temporary discharging procedure may be determined to a time (4 seconds) identical to or shorter than the set time (e.g., 5 seconds). When the number of charge/discharge cycles of the battery exceeds the threshold value, the processor 130 may increase the discharge time of the battery to discharge the battery for 6 seconds, and when the number of charge/discharge cycles of the battery is equal to or smaller than the threshold value, the time length of the temporary discharging procedure may be determined as 5 seconds corresponding to the set time. The above values are illustrative only and should not be construed as limiting.

According to some embodiments of the present disclosure, since the battery is discharged for a specified time while being charged and charging is resumed at a current rate that can compensate for the change amount of the SOC according to the discharge, the battery can be completely charged to correspond to a preset charging schedule. In addition, according to some embodiments of the present disclosure, the SOC of the battery can be predicted more accurately as the precipitated lithium is removed. In addition, the charging efficiency and accuracy of SOC prediction can be further improved by controlling the discharging time according to the degree of degradation of the battery.

The battery control apparatus 100 according to the present disclosure may be applied to a battery pack. That is, the battery pack according to the present disclosure may include the battery control apparatus 100 according to the present disclosure. In addition, the battery pack according to the present disclosure may further include, in addition to the battery control apparatus 100 according to the present disclosure, components normally included in the battery pack, such as one or more batteries, a battery management system (BMS), a current sensor, a relay, a fuse, a pack case, and the like. In this case, a secondary battery included in the battery pack may be a subject controlled by the battery control apparatus 100 according to the present disclosure, that is, a target battery. In addition, at least some components of the battery control apparatus 100 according to the present disclosure may be implemented as conventional components included in the battery pack. For example, the measuring unit 110 of the battery control apparatus 100 according to the present disclosure may be implemented by a voltage sensor included in the battery pack. In addition, at least some functions or operations of the processor 130 of the battery control apparatus 100 according to the present disclosure may be implemented by the BMS included in the battery pack.

In addition, the battery control apparatus 100 according to the present disclosure may be applied to an electric vehicle. That is, the electric vehicle according to the present disclosure may include the battery control apparatus 100 according to the present disclosure. In particular, in the case of an electric vehicle, since a battery pack is a very important component as a driving source, the battery control apparatus 100 according to the present disclosure may be more usefully applied. In addition, the electric vehicle according to the present disclosure may further include various other devices, such as a vehicle body, a vehicle control unit such as an ECU, a motor, a connection terminal, a DC-DC converter, and the like, in addition to the battery control apparatus 100. In addition, the electric vehicle according to the present disclosure may further employ components normally included in electric vehicles.

FIG. 5 is a flowchart schematically illustrating a battery control method according to some embodiments of the present disclosure. The method of FIG. 5 may be executed in response to the battery control apparatus 100 receiving a message notifying the start of a charging procedure for the battery from an external charger/discharger. In FIG. 5, the subject of each step may be each component of the battery control apparatus 100 according to the present disclosure described above. For convenience of description, it is assumed that the SOC of the battery at the time point when the method of FIG. 5 is initiated is less than the first criterion SOC.

Referring to FIGS. 1 to 5, in step S510, the processor 130 proceeds with a constant current charging procedure using a first current rate. For example, the processor 130 may request an external charger/discharger to supply a charging current of a magnitude corresponding to the first current rate.

In step S520, the processor 130 determines whether the SOC of the battery, which is determined based on the voltage measurement value representing the voltage of the battery received from the measuring unit 110, reaches the first criterion SOC. The voltage measurement value of the battery can be measured periodically or at designated time intervals through the measuring unit 110 while the battery is being charged at the first current rate.

The first criterion SOC is a value predetermined to prevent lithium precipitation on the negative electrode of the battery when the battery is subjected to the constant current charging procedure using the first current rate. For example, the first criterion SOC may be an expected or predetermined SOC value in which lithium precipitation starts to occur at the negative electrode of the battery or the severity of lithium precipitation increases to a certain level, when constant current charging is continued at the first current rate from the time point when the battery SOC is lower than the first criterion SOC.

If the value of step S520 is "yes", it proceeds to step S530. If the value of step S520 is "no", the processor 130 returns to step S510 and continues the constant current charging procedure using the first current rate.

In step S530, the processor 130 proceeds with a temporary discharging procedure. That is, in step S530, the constant current charging procedure using the first current rate is converted to a temporary discharging procedure. The temporary discharging procedure may proceed with a constant current of a specified magnitude for a specified time. That is, the battery is discharged between the constant current charging procedure using the first current rate and the constant current charging procedure using the second current rate. As the battery is discharged, at least a part of lithium precipitated on the negative electrode of the battery may be removed.

In step S540, the processor 130 proceeds with a constant current charging procedure using a second current rate. That is, in step S540, the temporary discharging procedure is converted to a constant current charging procedure using a second current rate.

In step S550, the processor 130 determines whether the SOC of the battery reaches the second criterion SOC. If the value of step S540 is "yes", the method of FIG. 5 may end. If the value of step S550 is "no", the processor 130 returns to step S540 and continues the constant current charging procedure using the second current rate.

In FIG. 5, it is illustrated that the SOC of the battery is terminated when the second criterion SOC is reached, but this is only one example. If the multi-stage integrity procedure includes three or more constant current charging procedures, additional constant current charging procedures or constant voltage charging procedures may be subsequently performed.

Figure 6:
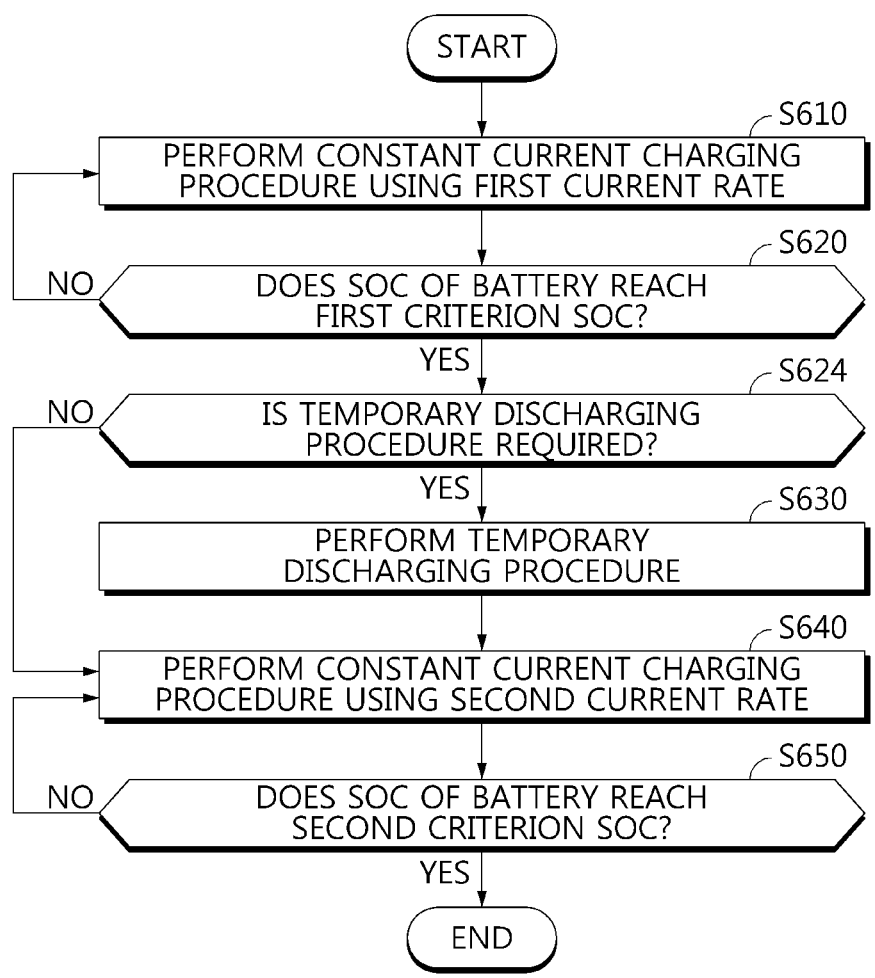
FIG. 6 is a flowchart schematically illustrating a battery control method according to embodiments of the present disclosure.

FIG. 6 is a flowchart schematically illustrating a battery control method according to some embodiments of the present disclosure. The method of FIG. 6 may be executed in response to the battery control apparatus 100 receiving a message notifying the start of a charging procedure for the battery from an external charger/discharger. In FIG. 6, the subject of each step may be each component of the battery control apparatus 100 according to the present disclosure described above. For convenience of description, it is assumed that the SOC of the battery at the time point when the method of FIG. 6 is initiated is less than the first criterion SOC.

Referring to FIGS. 1 to 4 and 6, in step S610, the processor 130 proceeds with a constant current charging procedure using a first current rate.

In step S620, the processor 130 determines whether the SOC of the battery, which is determined based on the voltage measurement value representing the voltage of the battery received from the measuring unit 110, reaches the first criterion SOC. The voltage measurement value of the battery can be measured periodically or at designated time intervals through the measuring unit 110 while the battery is being charged at the first current rate.

The first criterion SOC is a value predetermined to prevent lithium precipitation on the negative electrode of the battery when the battery is subjected to the constant current charging procedure using the first current rate. For example, the first criterion SOC may be an expected or predetermined SOC value in which lithium precipitation starts to occur at the negative electrode of the battery or the severity of lithium precipitation increases to a certain level, when constant current charging is continued at the first current rate from the time point when the battery SOC is lower than the first criterion SOC.

If the value of step S620 is "yes", the process proceeds to step S624. If the value of step S620 is "no", the processor 130 returns to step S610 and continues the constant current charging procedure using the first current rate.

In step S624, the processor 130 determines whether a temporary discharging procedure for the battery needs to be performed. The processor 130 may determine whether a temporary discharging procedure needs to be performed based on the degree of use of the battery. For example, when the degree of use of the battery is greater than or equal to the threshold value, the value of step S624 may be output as "yes", and otherwise, the value of step S624 may be output as "no". If the value of step S624 is "yes", the process proceeds to step S630. When the value of step S624 is "no", step S640 may be performed.

In this regard, even if the magnitude of the current impact is the same, as the battery is degraded, greater internal damage is caused to the battery. Considering this degradation characteristic, when it is determined that the temporary discharging procedure needs to be performed, the processor 130 may execute at least one of (i) an operation of determining the time length of the temporary discharging procedure to have a continuous or discrete negative correlation with the degree of use of the battery, or (ii) an operation of determining the magnitude of the constant current for the temporary discharging procedure to have a continuous or discrete negative correlation with the degree of use of the battery. That is, as the degree of use of the battery increases (that is, as the battery is degraded), the time length of the temporary discharging procedure and the magnitude of the constant current (discharge current) decrease continuously or discretely. The negative correlation may be defined as a predetermined function that takes the degree of use of the battery as an input variable and outputs at least one of the time length of the temporary discharging procedure and the magnitude of the discharge current.

Accordingly, there is a technical advantage that the level of the current impact applied to the battery when switching from the constant current charging procedure related to the first current rate to the temporary discharging procedure (i.e., the difference between the first current rate and the magnitude of the discharge current) and the current impact applied to the battery when switching from the temporary discharging procedure to the constant current charging procedure related to the second current rate (i.e., the difference between the magnitude of the discharge current and the adjusted second current rate) is mitigated according to the degradation of the battery.

In step S630, the processor 130 proceeds with a temporary discharging procedure. For example, the processor 130 may request an external charger/discharger to flow a discharge current to the battery according to the discharging information of the temporary discharging procedure.

In step S640, the processor 130 proceeds with a constant current charging procedure using a second current rate.

In step S650, the processor 130 determines whether the SOC of the battery reaches the second criterion SOC. If the value of step S650 is "yes", the method of FIG. 6 may end. If the value of step S650 is "no", the processor 130 returns to step S640 and continues the constant current charging procedure using the second current rate.

In FIG. 6, it is illustrated that the SOC of the battery is terminated when the second criterion SOC is reached, but this is only one example. If the multi-stage integrity procedure includes three or more constant current charging procedures, additional constant current charging procedures or constant voltage charging procedures may be subsequently performed.

Unlike the embodiments described with reference to FIG. 5 in which the temporary discharging procedure is unconditionally performed, in the embodiments described with reference to FIG. 6, the temporary discharging procedure can be selectively performed according to the degree of use of the battery.

FIG. 7 is a diagram schematically showing a battery control method according to embodiments of the present disclosure. The method of FIG. 7 may be executed in response to the battery control apparatus 100 receiving a message notifying the start of a charging procedure for the battery from an external charger/discharger. In FIG. 7, the subject of each step may be each component of the battery control apparatus 100 according to the present disclosure described above. For convenience of description, it is assumed that the SOC of the battery at the time point when the method of FIG. 7 is initiated is less than the first criterion SOC.

Referring to FIGS. 1 to 4 and 7, in step S710, the processor 130 proceeds with a constant current charging procedure using a first current rate.

In step S720, the processor 130 determines whether the SOC of the battery, which is determined based on the voltage measurement value representing the voltage of the battery received from the measuring unit 110, reaches the first criterion SOC. The voltage measurement value of the battery can be measured periodically or at designated time intervals through the measuring unit 110 while the battery is being charged at the first current rate.

The first criterion SOC is a value predetermined to prevent lithium precipitation on the negative electrode of the battery when the battery is subjected to the constant current charging procedure using the first current rate. For example, the first criterion SOC may be an expected or predetermined SOC value in which lithium precipitation starts to occur at the negative electrode of the battery or the severity of lithium precipitation increases to a certain level, when constant current charging is continued at the first current rate from the time point when the battery SOC is lower than the first criterion SOC.

If the value of step S720 is "yes", the process proceeds to step S724. If the value of step S720 is "no", the processor 130 returns to step S710 and continues the constant current charging procedure using the first current rate.

In step S724, the processor 130 determines whether a temporary discharging procedure for the battery needs to be performed. The processor 130 may determine whether a temporary discharging procedure needs to be performed based on the degree of use of the battery. For example, when the degree of use of the battery is greater than or equal to the threshold value, the value of step S724 may be output as "yes", and otherwise, the value of step S724 may be output as "no". When the value of step S724 is "yes", the process proceeds to step S726. When the value of step S724 is "no", step S742 may be performed.

In this regard, when it is determined that the temporary discharging procedure needs to be performed, at least one of (i) an operation of determining the time length of the temporary discharging procedure to have a continuous or discrete negative correlation with the degree of use of the battery, or (ii) an operation of determining the magnitude of the constant current for the temporary discharging procedure to have a continuous or discrete negative correlation with the degree of use of the battery can be executed, consistent with the above description with reference to FIG. 6.

In step S726, the processor 130 determines an adjusted second current rate based on the discharging information of the temporary discharging procedure (see Equation 2). The adjusted second current rate is different from the original second current rate according to the multi-stage charging protocol data.

In step S730, the processor 130 proceeds with a temporary discharging procedure.

In step S740, the processor 130 proceeds with a constant current charging procedure using the adjusted second current rate (determined in step S726).

In step S742, the processor 130 proceeds with a constant current charging procedure using a second current rate.

In step S750, the processor 130 determines whether the SOC of the battery reaches the second criterion SOC. If the value of step S750 is "yes", the method of FIG. 7 may end. If the value of step S750 is "no", the processor 130 returns to step S740 or step S742 and continues the constant current charging procedure using the second current rate. Here, if the value of step S724 is determined to be "yes" and the value of step S750 is determined to be "no", the process returns to step S740. Meanwhile, if the values of step S724 and step S750 are both determined to be "no", the process may return to step S742.

In FIG. 7, it is illustrated that the SOC of the battery is terminated when the second criterion SOC is reached, but this is only one example. If the multi-stage integrity procedure includes three or more constant current charging procedures, additional constant current charging procedures or constant voltage charging procedures may be subsequently performed.

Unlike the embodiments described with reference to FIG. 6 in which the temporary discharging procedure is unconditionally performed, in the embodiments described above with reference to FIG. 7, when a temporary discharging procedure is required, the constant current charging procedure using the adjusted second current rate is performed instead of the original second current rate included in the multi-stage charging protocol data.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

What is claimed is:

1. A battery control apparatus, comprising:
    a measuring unit configured to measure a voltage of a battery and output a voltage measurement value representing the measured voltage;
    a memory for storing a multi-stage charging protocol data including a first current rate, a second current rate used in another constant current charging procedure following a constant current charging procedure using the first current rate, a first criterion state of charge (SOC) associated with the first current rate, and a second criterion SOC associated with the second current rate, wherein the first criterion SOC is a value predetermined to prevent lithium precipitation of the battery in the constant current charging procedure using the first current rate, and the second criterion SOC is a value predetermined to prevent lithium precipitation of the battery in the another constant current charging procedure using the second current rate; and a processor for identifying a SOC of the battery based on the voltage measurement value received from the measuring unit, wherein the processor is configured to:
- perform a temporary discharging procedure, when the SOC of the battery reaches the first criterion SOC while the constant current charging procedure using the first current rate is in progress,
- determine an adjusted second current rate so as to be proportional to a sum of a difference between the first criterion SOC and the second criterion SOC and a SOC change amount by the temporary discharging procedure and to be inversely proportional to a difference between a criterion time and a time length of the temporary discharging procedure included in the discharging information, wherein the criterion time is an expected time to be taken until the SOC of the battery reaches the second criterion SOC from the first criterion SOC by assuming the constant current charging procedure using the second current rate is performed immediately from a time point that the SOC of the battery reaches the first criterion SOC, and
- perform a constant current charging procedure using the adjusted second current rate, after the temporary discharging procedure is finished, wherein the processor is configured to determine the adjusted second current rate so that a sum of (i) a time length of the temporary discharging procedure included in the discharging information and (ii) a time required for the SOC of the battery to reach the second criterion SOC by the constant current charging procedure using the adjusted second current rate immediately from an end time point of the temporary discharging procedure is equal to the criterion time.

2. The battery control apparatus according to claim 1, wherein the processor is configured to determine the time length of the temporary discharging procedure to have a continuous or discrete negative correlation with a degree of use of the battery.

3. The battery control apparatus according to claim 1, wherein the processor is configured to:
- determine whether the temporary discharging procedure needs to be performed, based on a degree of use of the battery, and
- perform the temporary discharging procedure when the SOC of the battery reaches the first criterion SOC, when it is determined that the temporary discharging procedure needs to be performed.

4. A battery pack, comprising the battery control apparatus according to claim 1.

5. An electric vehicle, comprising the battery control apparatus according to claim 1.

6. The battery control apparatus according to claim 1, wherein the processor is configured to perform the temporary discharging procedure so that the battery is discharged with a constant current of a magnitude less than the first current rate.

7. The battery control apparatus according to claim 6, wherein the processor is configured to determine the magnitude of the constant current for the temporary discharging procedure to have a continuous or discrete negative correlation with a degree of use of the battery.

8. A method for controlling a battery, comprising:
- performing, by a battery control apparatus, a temporary discharging procedure, when a state of charge (SOC) of a battery identified based on a voltage measurement value representing a measured voltage of the battery reaches a first criterion SOC associated with a first current rate while a constant current charging procedure using the first current rate is in progress, wherein the first criterion SOC is a value predetermined to prevent lithium precipitation of the battery in the constant current charging procedure using the first current rate;
- determining, by the battery control apparatus, an adjusted second current rate so as to be proportional to a sum of a difference between the first criterion SOC and a second criterion SOC and a SOC change amount by the temporary discharging procedure and to be inversely proportional to a difference between a criterion time and a time length of the temporary discharging procedure included in the discharging information, wherein the criterion time is an expected time to be taken until the SOC of the battery reaches the second criterion SOC from the first criterion SOC by assuming an another constant current charging procedure using a second current rate is performed immediately from a time point that the SOC of the battery reaches the first criterion SOC, and the second criterion SOC is a value predetermined to prevent lithium precipitation of the battery in the another constant current charging procedure using the second current rate; and
- performing, by the battery control apparatus, a constant current charging procedure using the adjusted second current rate, after the temporary discharging procedure is finished, wherein the adjusted second current rate is determined so that a sum of (i) a time length of the temporary discharging procedure included in the discharging information and (ii) a time required for the SOC of the battery to reach the second criterion SOC by the constant current charging procedure using the adjusted second current rate immediately from an end time point of the temporary discharging procedure is equal to the criterion time.

9. The method of claim 8, further comprising:
- performing the temporary discharging procedure so that the battery is discharged with a constant current of a magnitude less than the first current rate.

10. The method of claim 9, wherein the magnitude of the constant current for the temporary discharging procedure is determined to have a continuous or discrete negative correlation with a degree of use of the battery.

11. The method of claim 8, further comprising:
- determining whether the temporary discharging procedure needs to be performed, based on a degree of use of the battery; and
- performing the temporary discharging procedure when the SOC of the battery reaches the first criterion SOC, when it is determined that the temporary discharging procedure needs to be performed.

* * * * *